O. C. RIXSON.
SUSPENSION FOR VEHICLES.
APPLICATION FILED JAN. 31, 1920.
1,392,356.
Patented Oct. 4, 1921.
2 SHEETS—SHEET 1.
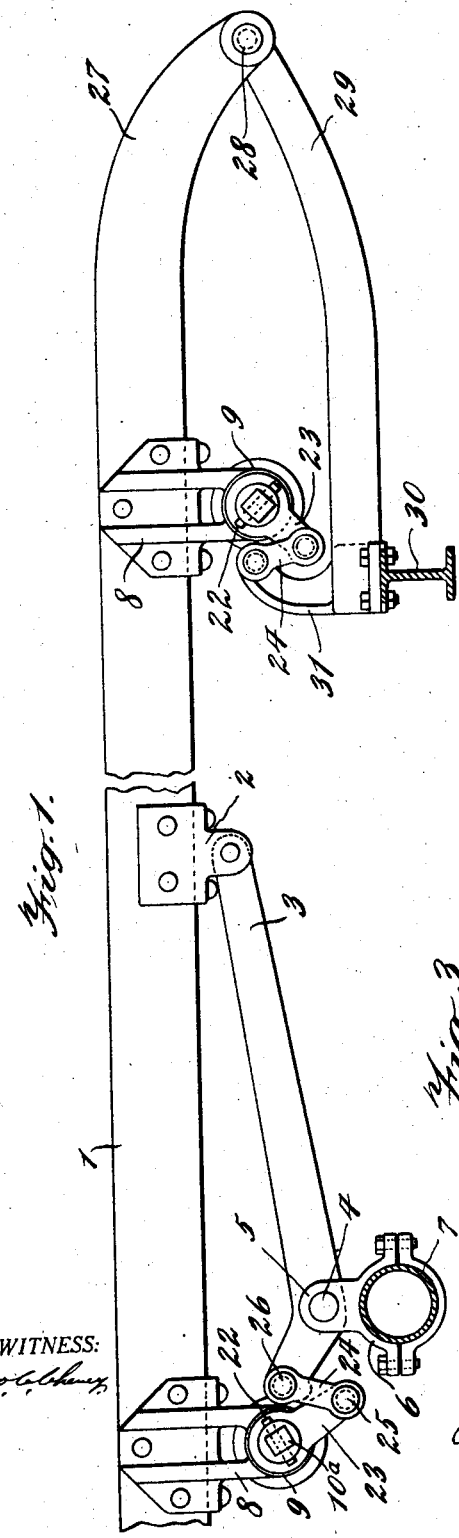
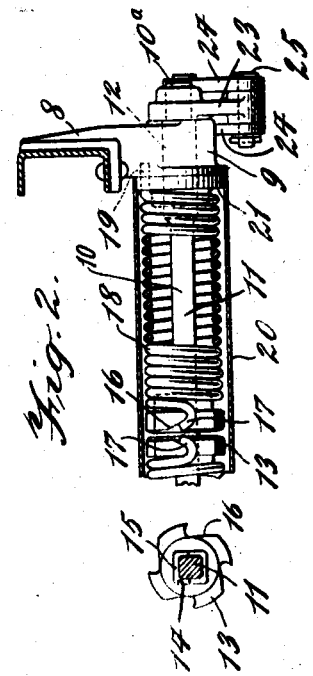
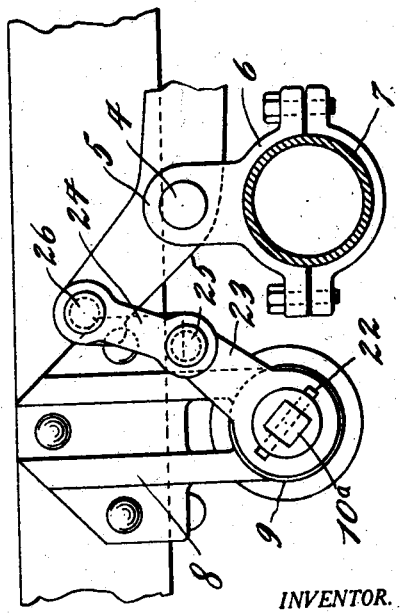
WITNESS:
INVENTOR.
Oscar C. Rixson,
BY
Rosenbaum, Stockbridge & Bord,
ATTORNEYS.

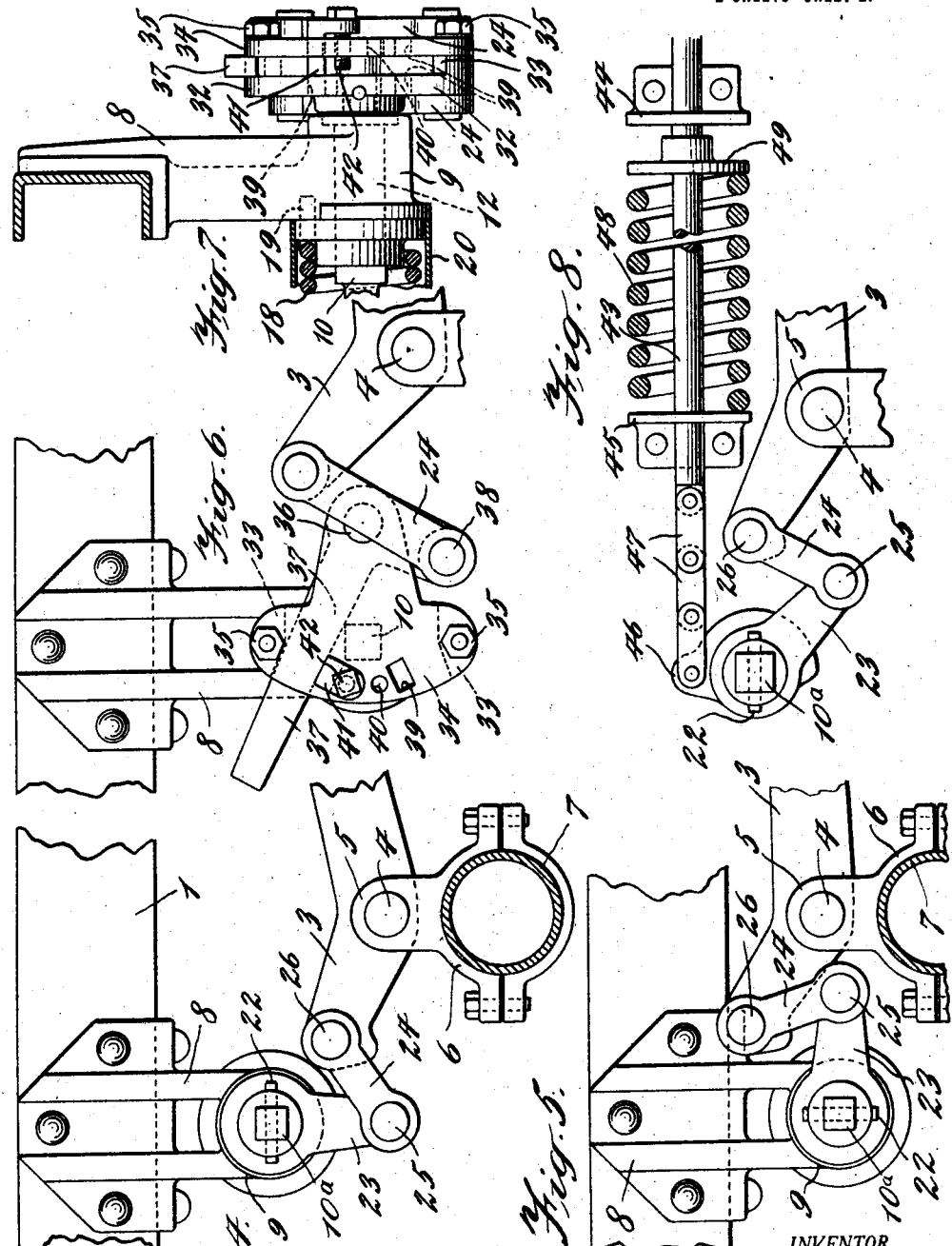

UNITED STATES PATENT OFFICE.

OSCAR C. RIXSON, OF NEW ROCHELLE, NEW YORK.

SUSPENSION FOR VEHICLES.

1,392,356.  Specification of Letters Patent.  Patented Oct. 4, 1921.

Application filed January 31, 1920. Serial No. 355,478.

*To all whom it may concern:*

Be it known that I, OSCAR C. RIXSON, a citizen of the United States, residing at New Rochelle, in the county of Westchester and State of New York, have invented certain new and useful Improvements in Suspensions for Vehicles, of which the following is a full, clear, and exact description.

This invention relates to the resilient suspension or support of the body or frame of a vehicle upon its running gear or axles.

One object of the invention is to provide a spring suspension which not only serves the usual functions of cushioning ordinary vibrations and movements of the body of the vehicle, but serves also as a shock absorber to limit the excessive movements of the body and axles in a manner to avoid abrupt stops and rapid recoils of the relatively moved parts.

A further object of the invention is to provide a spring suspension which causes both sides of the body of the vehicle to move up and down together and equally regardless of the distribution of the load or the unevenness of the roadway over which the vehicle is passing.

A still further object is to provide a resilient suspension for vehicles, the tension or sensitiveness of which can be adjusted at will to meet the conditions of load, and a final object is to accomplish these objects in a construction which is simple, durable, effective and inexpensive.

These objects are attained by a combination of suitable resilient means and a peculiar lever system all of which will be fully explained in connection with the accompanying drawings in which:

Figure 1 is a side elevation illustrating one embodiment of my invention with the parts in the relative position which they assume when the vehicle is not loaded.

Fig. 2 is a rear elevation of a portion of the same with some of the parts in section.

Fig. 3 is an elevation of certain of the parts showing the relative positions approached as the frame reaches the end of its extreme down stroke, Fig. 4 is an elevation of certain of the parts showing their relative position when the frame has about reached the end of its extreme up stroke.

Fig. 5 is an elevation of certain of the parts showing their relative position when the frame is loaded and at rest.

Fig. 6 is an elevation of an embodiment of my invention in which the sensitiveness of the support is variable.

Fig. 7 is a rear elevation of the same and

Fig. 8 is an elevation of a modification of the connection between the spring and the shaft.

In the illustrated embodiment (referring particularly to Figs. 1 to 5) the frame 1 carries at each side a depending lug 2 to which is pivotally connected one end of a lever 3. The intermediate portion of each lever 3 is pivotally connected at 4 to a lug 5 carried by a collar 6 rigidly secured to the rear axle 7 such as by clamping. Between the free end of each lever 3 and the frame 1, I provide a lever system and suitable resilient means which will now be described. Depending from each side of the frame is a rigid bracket 8 provided with a bearing member 9. Rotatably mounted in said bearing members and extending transversely of the frame is a crank shaft 10 having square or non-circular end portions $10^a$ and central portion 11, and circular intermediate portions 12 of greater diameter which are received by the bearing members 9. A pair of disks 13 having square or non-circular openings 14 therethrough which are large enough to pass over the circular portion of the shaft, are held against rotation on the shaft by means of square or non-circular split bushings 15, which fit within the openings 14. Each disk 13 has a plurality of spaced notches 16 in its periphery into any one of which is placed the hooked end 17 of the helical torsion spring 18 which surrounds the shaft and has its other end 19 secured to a bearing member in any suitable manner. I prefer to use two of these springs, one extending from each of the disks to the corresponding bearing member. A suitable cover 20 for the springs may be carried by the shoulders 21 of the bearing members. Secured to each end $10^a$ of the shaft by suitable means, such as a pin 22, are crank members, which in the simplest embodiment consist of arms 23. Links 24 are pivotally connected at one end to both sides of the free end of the cranks by means of crank pins 25, and at their other ends to the free end of the lever 3 by pins 26. The lever 3 connects the frame and axle sufficiently to cause their common movement along the roadway, while the pivotal connectings of the lever enable relative movement between the frame and axle, which are controlled by the lever system and resilient means. Because of the connections between the shaft 10 and the axle on opposite sides of the vehicle, any relative movement between one side of the vehicle frame 1 and the axle will cause the shaft to rotate and produce a corresponding movement between the other side of the vehicle frame 1 and the axle. Thus regardless of the distribution of the load upon the vehicle the frame will not tip or sag more on one side than on the other and both sides of the vehicle body will move up and down together, and equally. Relative movement between the frame and the axle will, because of the connection of the crank arm to the axle by links 24, cause the crank arm 23 and shaft 10 to rotate about the axis of the bearings in one direction or the other. Thus when the axle and frame approach each other, the crank arm and shaft will be rotated counter-clockwise (Fig. 1) and the spring 18 will be tensioned or wound up. When the axle and frame separate, the crank and shaft will be rotated clockwise (Fig. 1), and the spring will assist or produce this movement. In practice, the frame will approach the axle until the tension or stress in the spring, which becomes greater with the rotation of the shaft 10, is sufficient to balance the turning movement produced by the weight of the frame and body and cause equilibrium of the parts. As the vehicle passes over rough or uneven places in the roadway, the axle and frame will be caused to approach each other and the spring will be tensioned or wound up still more, and the extra stress or tension thus imparted to the spring will cause it to return the frame and axle to their former relative position in the manner common to all spring suspensions. If the frame is moved beyond the normal position, during the return movement, the weight of the frame together with any load carried thereby will cause the parts to return to their normal relative position in equilibrium. During the rotation of the crank arm in the manner set forth the crank pin 25 moves through an arc of a circle and not directly vertical, so that some provision for permitting a limited amount of horizontal movement of the pin is necessary. While a slot in the end of the lever 3 for receiving the crank pin would provide for such a movement I prefer to use the construction illustrated, in which the links 24 oscillate through a small arc about the pivot 26 to permit of the requisite horizontal movement of the crank pin and at the same time provide a positive connection between the lever 3 and the crank. It is desirable of course that the links 24 be always as near the vertical position as possible, that is, extending generally in the direction of relative movement between the frame and the axle. The links 24 must not be horizontal because such a position would lock the pin 25 against this necessary horizontal movement and therefore they should make a considerable angle with any horizontal plane or with a plane or line perpendicular to the direction of relative movement between the frame and axle.

To the forward end 27 of each side piece of the frame is pivotally connected at 28, the upturned end of an arm 29 extending forwardly from and rigidly attached to the front axle 30. Slightly offset from the arm 29 and in the plane of the front axle is an upwardly extending lug 31. This construction takes the place of the lever 3 that is used in connection with the rear axle, and the upper ends of the links 24 are pivoted to the lug 31. In other respects, the suspension for the frame upon the forward axle is the same as that for the rear axle.

In Fig. 1 the parts are shown in the position of equilibrium which they are designed to have when the car is light, that is unloaded. In Fig. 5, the parts are shown in the relative positions that they will occupy when the car carries its normal load, and equilibrium exists. Since the frame and axle are relatively movable, one of them can be considered stationary for the purpose of illustration, and we will assume this to be the axle. The horizontally extending crank shaft may be said to have a partial rotation about the crank pin as an axle or fulcrum, except that since the crank shaft can only move vertically, the fulcrum shifts in a substantially horizontal direction to compensate for or take up the horizontal component of the rotary movement. In other words, there may be said to be a rotary movement of the crank shaft about the crank pin, but the rotation is upon an axis or fulcrum moving at such a rate and in such directions that the actual path traversed by the crank shaft is a vertical path. When the crank arm is substantially horizontal (Fig. 5,) which is the normal position of equilibrium with the vehicle loaded, all of the force produced by the body and frame tending to rotate the crank shaft about the fulcrum (which is the crank pin) is applied at right angles to the crank arm and thus produces a turning torque of substantially an equal amount, and very little if any pull is exerted lengthwise of the crank arm. The torque so produced is opposed by the spring and equilibrium exists. When an excess downward force is applied to the crank arm, such as would occur when the vehicle passes over an uneven roadway, rotation in a counterclockwise direction (Fig. 5) might occur. As such rotation of the crank arm proceeds, an increasing proportion of the force applied is exerted in pulling along the length of the crank arm and less is effective in turning the crank arm. When the parts reach the Fig. 3 position, the major portion of the pull is along the length of the crank arm and the minor portion is turning the crank arm in opposition to the spring. Thus more and more of the shock or excessive force applied is absorbed along the length of the crank arm and less acts to produce rotation of the crank arm, so that the motion of the frame or body is in addition to the action of the spring, checked by a direct pull along the length of the crank arm which increases with the amount of relative movement between the frame and axle away from a normal relative position. This causes the frame to be brought to rest gradually and without an abrupt action such as would occur if ordinary limit stops were used. When the downward movement of the body has thus been checked, the reaction of the spring will cause the parts to return to normal position as soon as the excessive downward force is removed, and the momentum will carry them beyond the normal relative position and the position illustrated in Fig. 4 will be approached. If the parts are in the Fig. 4 position, the reaction of the spring upon the crank arm tending to turn the crank arm about the fixed (assumed) fulcrum, which is the crank pin, will be acting in a horizontal direction and will not cause any further vertical movement because the crank shaft is then as far away vertically with respect to its fulcrum as it can be, and further vertical movement will be opposed by a direct pull along the length of the crank arm. The parts are thus again brought to rest gradually and without the abrupt action which is incident to the use of limit stops. In actual practice, the design of the spring and parts is such that the Fig. 3 and Fig. 4 positions will be approached but seldom if ever reached. It is known that a spring suspension is most sensitive under a certain loading, and I have found that by shifting the crank pin toward and from the axis of the shaft that the maximum sensitiveness can be obtained for a plurality of different loadings of the vehicle. In Figs. 6 and 7 I have illustrated my preferred construction of crank member for accomplishing this result. Upon the end 10ª of the shaft 10 is firmly secured the plate 32 having the edge bosses 33 thereon. A second plate 34 is secured face to face upon the plate 32 such as by screws 35, the bosses spacing the two plates apart a short distance to form a chamber between them. Disposed within said chamber and pivoted between the plates at 36 is a bell crank lever 37, one arm of which extends beyond the plates to form an operating handle and the other arm of which carries the crank pin 38, by means of which it is connected to the links 24. The plates are both provided with a pair of alined apertures 39, and the plate 34 is also provided with threaded holes 40 adjacent to the apertures 39. A key 41 is adapted to be passed through either set of the alined apertures and across the chamber between the plates to confine the lever 37 in position against the boss 33 at either end of the chamber. A screw 42 is adapted to be passed through an aperture in an offset portion of the key and into one of the threaded holes 40 to secure the key against unintentional removal from the apertures. Movement of the lever from one end of the chamber to the other shifts the crank pin toward or from the axis of the shaft and thus decreases or increases the effective length of the crank arm. I have found when the effective crank arm is thus shortened that the suspension is less sensitive than when it is made longer, and thus the crank arm can be adjusted to have its maximum sensitiveness for any of a plurality of loadings of the vehicle.

In the construction illustrated in Fig. 8, the spring is not carried by the shaft 10 but nevertheless operates to oppose its rotation in one direction, and assist or produce it in the other direction. According to this arrangement I mount a rod 43 for sliding movement in a pair of brackets 44 and 45, which are carried by the frame. One end of the rod is connected to a lug 46 upon the crank arm or shaft by means of one or more links 47 pivotally connected to each other, to the rod, and to the lug 46. The spring 48 surrounds the rod between the brackets 44 and 45 and is adapted to be compressed against one of the brackets 45 by a plate 49 fixedly carried by the rod at the other end of the spring and between the brackets. Thus rotation of the shaft counterclockwise (Fig. 8) will pull on the rod 43 and compress the spring between the plate 49 and the bracket 45, and rotation clockwise will release the spring. The spring of course constantly tends to produce the clockwise rotation and opposes the rotation produced by the weight of the vehicle.

The friction between the bearings and the shaft 10 also tends to resist movement of the crank shaft from any position of rest and thus assists in checking relative movements to some extent. In fact by varying the friction between the shaft and the bearing, such as by a split bearing the parts of which are clamped together, the amount of resistance to relative movement derived from this source could be varied within certain limits.

I have illustrated my invention as applied between the frame and the axles, but it is obvious that it can be applied between any two relatively moving parts of a vehicle, and I have used the expression "running gear" in the claims to mean the axles or other suitable support for the body frame.

I claim:

1. A complete suspension for vehicle bodies comprising in combination with the body and an axle, an arm pivotally and non-resiliently connected to both the body and the axle for movement about axes substantially parallel with the axle and having one of its pivots movable substantially in a horizontal direction to accommodate a vertical movement of the other pivot with the body, whereby the maximum vertical movement of the body in one direction, will cause a direct pull substantially along the length of the arm, and resilient means constantly tending to rotate the arm in one direction about one of its pivots and constantly urging said body and axle apart.

2. A complete suspension for vehicle bodies comprising in combination with two relatively movable parts such as the body and axle, an arm pivotally and non-resiliently connected at one end to one of said parts for movement about an axis parallel to the axle, a non-resilient connection between the other end of said arm and the other of said movable parts permitting movement of said other end of the arm at substantially right angles to the direction of relative movement between the parts, whereby the maximum relative movement between the parts in one direction, will cause a pull in a direction substantially along the length of the arm, and resilient means constantly opposing pivotal movement of the arm in one direction, and constantly urging said parts apart.

3. In a spring suspension for vehicles, the combination of the body frame, an axle having a non-resilient extension, a crank arm rotatably and non-resiliently carried by the frame, a spring for opposing rotary movement of the crank arm in one direction, a link pivotally depending from the axle extension and also pivoted to the free end of the crank arm, the strength of the spring having a value sufficient when the vehicle carries its normal load to bring the body to rest with the crank arm substantially horizontal and yielding when subjected to an excessive load to permit rotation of the crank arm until the pull thereon is in a direction substantially along the direction of its length for a maximum relative movement between the body frame and axle.

4. In a spring suspension for vehicles, the combination of a body frame, an axle, a crank rotatably and non-resiliently carried by the frame, a spring for opposing rotary movement of the crank in one direction, a lever pivoted at one of its ends to the frame and at a point intermediate its ends to the axle, and a link pivotally depending from the other end of the lever and also pivoted to the free end of the crank arm.

5. In a spring suspension for vehicles, the combination of a body frame, an axle, a crank rotatably and non-resilently carried by the frame for rotation about an axis substantially parallel with the axle, a spring for opposing rotary movement of the crank in one direction, a non-resilient member connected to the axle, and a link pivotally depending from the member and also pivotally connected to the free end of the crank, said crank and link having their relative lengths proportioned to cause the pull between them to lie substantially along and in the direction of their lengths at the limit of the maximum relative movement between the frame and axle in one direction.

6. In a spring suspension for vehicles the combination with the body frame and an axle, of a shaft rotatably and non-resiliently carried by said body frame and extending from side to side thereof, a crank arm secured to each end of the shaft, resilient means opposing rotation of the shaft in one direction and non-resilient means connecting each crank arm to the axle in such a manner that relative movement between one side of the body frame and the axle will through the shaft, crank arms and connecting means cause a corresponding relative movement between the other side of the frame and the axle.

7. In a spring suspension for vehicles, the combination of two parts relatively movable toward and from one another, a shaft carried by one of said parts, resilient means connected to said shaft to oppose rotation thereof in one direction, a crank arm secured to said shaft, and having a portion carrying a crank pin adjustable thereon to bring the crank pin toward and from the axis of the shaft, means for securing the adjustable portion in adjusted positions, a connection between the crank pin and the other of said parts for limiting movement of the crank pin to a direction substantially laterally of the direction of movement between the relatively movable parts.

8. In a spring suspension for vehicles, the combination of two parts relatively movable toward and from one another, a shaft carried by one of said parts, resilient means connected to said shaft to oppose rotation thereof in one direction, a crank arm secured to said shaft and having a portion carrying a crank pin adjustable thereon to bring the crank pin toward and from the axis of the shaft, means for securing the adjustable portion in adjusted positions, a connecting rod pivotally connected to said crank pin and to the other of said parts, said rod extending generally in the direction of relative movement between the said parts.

9. In a spring suspension for vehicles, the combination of two parts relatively movable toward and from one another, a shaft carried by one of said parts, resilient means connected to oppose rotation of the shaft, a plate secured to one end of the shaft, a lever pivoted to said plate and carrying a crank pin at a distance from the pivot of the lever, and having an operating arm extending across the plate whereby operation of the lever will shift the crank pin toward or from the axis of the shaft, means carried by the plate for securing the lever in adjusted positions, and a connection between the crank pin and the other of said parts for preventing substantial movement of the crank pin in the direction of relative movement of the parts when the part carrying the shaft moves, and for causing said pin to have substantial movement in the direction of relative movement of the parts when the other of said parts moves with respect to the part carrying the shaft.

10. In a spring suspension for vehicles, the combination of two parts relatively movable toward and from one another, a shaft carried by one of said parts, resilient means connected to oppose rotation of the shaft, a plate secured to one end of the shaft, a lever pivoted to said plate and carrying a crank pin at a distance from the pivot of the lever and having an operating arm extending across the plate whereby operation of the lever will shift the crank pin toward or from the axis of the shaft, said plate having a plurality of apertures therein, means including a key adapted to be selectively placed in one of said apertures for securing said lever in adjusted position on the plate, and a connection between the crank pin and the other of said parts for preventing substantial movement of the crank pin in the direction of relative movement of the parts when the part carrying the shaft moves, and for causing said pin to have substantial movement in the direction of relative movement of the parts when the other of said parts moves with respect to the part carrying the shaft.

11. In a spring suspension for vehicles, the combination of two relatively movable parts, a plate pivotally carried by one of said parts, means opposing the rotation of said plate in one direction and carried by said one part, a member provided with a pivot portion and adjustably carried by said plate to be shifted thereon at will to bring the pivot portion toward or from the pivotal axis of the plate and a connection between the pivot portion and the other of said parts.

12. In a spring suspension for vehicles, the combination of two relatively movable parts, a plate pivotally carried by one of said parts, means carried by said one part for opposing the rotation of said plate in one direction, a lever pivotally carried by said plate, means for securing said lever in a plurality of adjusted positions on said plate, means for connecting said lever to the other of said parts, the point of connection of said means to said lever being shiftable toward and from the axis of the plate when the lever is shifted on the plate.

13. A suspension for vehicle bodies and the like, comprising in combination with two relatively moving parts such as the frame and the running gear, of bearing means carried by one of said parts, a shaft carried by said bearing means, a disk having a plurality of spaced notches in its periphery, a spring surrounding said shaft and connected at one end to the bearing means, said spring having a hook on its other end adapted to be received in any one of said notches, and means including a crank for connecting the shaft to the other of said parts whereby relative movement between said parts will cause a rotation of said shaft.

14. In a spring suspension for vehicles, the combination of two relatively movable parts, a shaft carried by one of said parts, resilient means connected to said shaft to oppose rotation thereof in one direction, a plate secured to an end of the shaft, a second plate secured to the first plate and forming with said first plate a chamber therebetween, a lever pivoted to said plates eccentric to said shaft and shiftable within said chamber to different operative positions, one end of said lever extending beyond said plates for manual operation, a connection between another portion of the lever and the other of said parts, both of said plates having a plurality of alined apertures therein, and a key adapted to be inserted through selected ones of said alined apertures to prevent movement of said lever from an adjusted position in said chamber.

15. In a spring suspension for vehicles, the combination of two relatively movable parts, a shaft carried by one of said parts, resilient means connected to said shaft to oppose rotation thereof in one direction, a plate secured to an end of the shaft, a second plate secured to the first plate and forming with said first plate a chamber therebetween, a lever pivoted to said plates eccentric to said shaft and shiftable within said chamber to different operative positions, one end of said lever extending beyond said plates for manual operation, a connection between another portion of the lever and the other of said parts, both of said plates having a plurality of alined apertures therein, a key adapted to be inserted through selected ones of said alined apertures to prevent movement of said lever from adjusted position in said chamber, and a screw carried by said key and adapted to screw into said second plate to prevent withdrawal of the key.

16. In a spring suspension for vehicles, the combination of two relatively movable parts, a shaft carried by one of said parts, resilient means connected to said shaft to oppose rotation thereof in one direction, a plate secured to an end of the shaft and having bosses on one face thereof at two opposite edges, a second plate arranged face to face with said first plate but spaced therefrom by said bosses, means for securing said second plate to said first plate, said plates having a plurality of alined apertures therein, a key adapted to pass through selected ones of said alined apertures, means for securing the key against unintentional removal, a lever pivoted between said plates eccentrically to said shaft and having a portion extending between and beyond said plates to enable manual operation thereof, said lever being held against one boss or the other by said key, said lever also having a pivot thereon shiftable toward and from the axis of said shaft when the lever is shifted from one position to the other, and a connection between the pivot and the other of said relatively movable parts.

17. In a spring suspension for vehicles, the combination of the body frame, an axle, a crank shaft extending transversely of the body frame and substantially parallel with the axle, non-resilient means for rotatably securing the shaft to the body frame, a crank at each end of the shaft, a pair of links pivoted one to the free end of each crank, and non-resilient means for pivotally securing the other ends of the links to the axle, whereby any displacement vertically of one side of the body frame imparts a corresponding displacement of an equal amount to the other side of the body frame.

18. In a complete spring suspension for vehicles, the combination of two parts relatively movable toward and from one another, an arm pivotally and non-resiliently connected to one of the parts, a link pivoted to the free end of the arm and also non-resiliently connected to the other of said parts, resilient means constantly tending to rotate said arm in one direction about its pivotal connection to said one of the parts so as to urge said parts apart, said spring having a strength sufficient to maintain the arm in a position approximately transverse to the relative movement of the parts for a normal loading of the vehicle, and yielding under an excessive load to permit rotation of the crank arm until the pull thereon is in a direction substantially along the direction of its length, said link being disposed to extend generally in the direction of relative movement of the parts when the vehicle is normally loaded.

19. In a spring suspension for vehicles, the combination of two relatively movable parts such as the body and axle, an arm pivotally and non-resiliently connected at one end to one of said parts for movement about an axis substantially parallel to the axle, a link pivoted to the free end of the arm, a pivotal and non-resilient connection between the free end of the link and the other of said parts, the arm and link being normally arranged in an angular position with respect to one another whereby the maximum relative movement of the parts in one direction will cause the three pivotal connections to move into substantially a straight line, and spring means opposing such a movement and constantly urging said parts apart.

In witness whereof, I hereunto subscribe my signature.

OSCAR C. RIXSON.